United States Patent [19]

Moutz

[11] 4,190,261
[45] Feb. 26, 1980

[54] COASTER-SLED BOARD

[76] Inventor: John A. Moutz, 2884 Eileen Dr., Akron, Ohio 44319

[21] Appl. No.: 878,715

[22] Filed: Feb. 17, 1978

[51] Int. Cl.² .............................................. B62K 9/00
[52] U.S. Cl. ............................... 280/87.01; 188/2 R; 280/88
[58] Field of Search .............. 280/87.01, 88; 188/2 R, 188/8, 192

[56] References Cited
U.S. PATENT DOCUMENTS

| | | | |
|---|---|---|---|
| 2,028,445 | 1/1936 | Gelbman | 280/88 X |
| 2,713,496 | 7/1955 | Ayers | 280/87.01 |

*Primary Examiner*—John A. Pekar
*Attorney, Agent, or Firm*—Oldham, Oldham, Hudak & Weber Co.

[57] ABSTRACT

A land vehicle comprising a coaster-sled board that has support members provided therefor including a front support member, pivotally positioned brake means are operatively carried by the board and a steering and brake control assembly is positioned in a longitudinally extending slot in the frame board and engages the front support member. Flexible means connect the steering assembly to the brake means whereby when the operator of the vehicle pushes the steering means forcibly forwardly in the slot, a braking action can be obtained, but yet steering action also is provided by the steering assembly.

5 Claims, 3 Drawing Figures

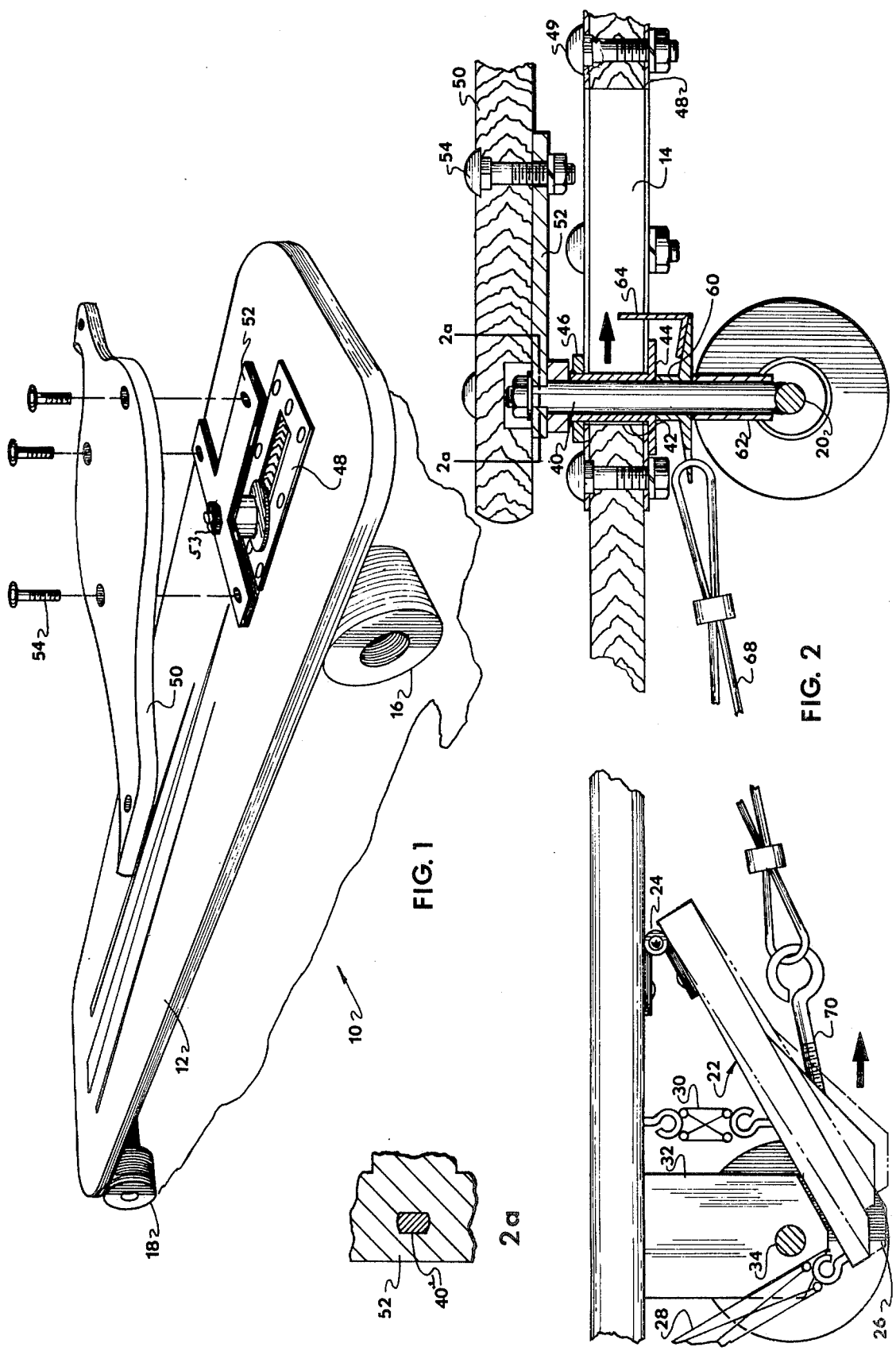

COASTER-SLED BOARD

BACKGROUND OF INVENTION

Heretofore there have been many different types of coaster vehicles and sleds provided for entertainment and exercise use. Some of these prior structures have endeavored to combine both a steering action and a braking function in the control means for the land vehicle. For example, a special control lever is shown in U.S. Pat. No. 2,713,496 and such lever can rock on a longitudinal axis to affect a braking action for the vehicle and yet the lever also is used for steering action. Another similar toy coaster wagon-sled article is shown in U.S. Pat. No. 2,766,994 wherein an upright is provided for rotation to steer the vehicle and this upright is oscillated on a longitudinal axis to provide a braking action. Yet other types of sled-coaster boards are shown in U.S. Pat. Nos. 2,353,501 and 3,345,080.

However, insofar as I am aware, all of these prior types of braking and steering means have not provided a positive, combined steering and braking action by steering means for either a coaster wagon or a sled. Nor have such means functioned with a positive braking action being obtained by a physical movement of the steering means longitudinally of the vehicle.

It appears that an improved coaster wagon-sled steering means would provide a safer, more positive acting vehicle where steering and braking actions are combined and controlled by one device having only a limited axial movement in the vehicle.

OBJECTS OF INVENTION

The general object of the present invention is to provide a novel and improved coaster wagon-sled type of a land vehicle wherein a combined steering and braking action is obtained by a member that is movable longitudinally of the vehicle to obtain a braking action thereon, and wherein a steering action can be simultaneously obtained at any time.

A further object of the invention is to position a combined steering and braking control unit on a land vehicle so that the unit can be moved only in a longitudinal slot provided in a frame board of the vehicle and yet also provide a steering action by a vertically positioned control rod forming part of such control unit.

Yet another object of the invention is to provide a controlled longitudinal sliding movement for steering and braking means in a vehicle and to provide a normal position for such control member at the rearmost end of the longitudinal slot in the vehicle.

Yet another object of the invention is to provide a sturdy, mechanically positive, reliable type of a combined steering and brake control means for a sled or coaster wagon and to make the unit from a relatively few parts but to have positive braking action over a long life with minimum maintenance and with maximum safety being incorporated in the unit.

The foregoing objects and other advantages of the invention will be made more apparent as the specification proceeds.

Reference now is made to the accompanying drawings, wherein:

FIG. 1 is a perspective view, partially exploded, of a land vehicle embodying the principles of the invention;

FIG. 2 is a side view, partially in vertical section and partly broken away, of the vehicle of FIG. 1 with the parts in assembled relationship to each other; and FIG. 2a is a section on line 2a—2a of FIG. 2.

When referring to corresponding members shown in the drawings and referred to in the specification, corresponding numerals are used to facilitate comparison therebetween.

While in the accompanying drawings, the support means for the vehicle of the invention is shown to be roller wheels, it should be appreciated that sled runners can be substituted for these wheels, as desired, and be mounted on the vehicle in a conventional manner whereby a sled unit is provided rather than a coaster wagon type of a unit as shown in the drawings.

SUBJECT MATTER OF INVENTION

A land vehicle of the sled-coaster wagon type is provided as one embodiment of the invention and it includes a flat support frame having a longitudinally extending slot in a front end thereof, a support means such as runners or wheels for the frame and including a front member or unit, pivotally positioned brake means for the vehicle and a steering and brake control assembly operatively engaging the front member and including a means or rod extending up through the slot, a steering member or device secured to an upper end of the said means, and flexible operating members connecting between the brake means and the front member to actuate the brake means upon forward movement of the steering and brake control assembly whereby forward movement of the steering means and/or control rod provides a braking action whereas the control rod and steering means can be turned through an arc at any time for the required steering action.

Reference now is particularly made to the details of the structure shown in the drawings, and a land vehicle in the form in this instance of a wagon 10 is shown. This vehicle 10 includes an elongated flat support frame 12 that has a longitudinally extending slot 14 at a front end portion thereof. The vehicle 10 has suitable support means or members provided therefor and in this instance, the support members comprise front wheels 16 and rear wheels 18 with the front wheels 16 being suitably mounted on and journalled on and/or secured to a front axle 20 that normally extends transversely of the vehicle and has a wheel journalled on or secured to each end thereof.

The vehicle 10 also has a suitable brake member 22 pivotally secured to a back portion of the frame 12 as by a hinge 24. The brake member 22 usually comprises an elongate block with a frictional strip or device 26 affixed to one portion thereof. The brake member 22 is urged upwardly of the vehicle at all times by suitable springs 28 and 30 that are secured to the frame 12 and operatively engage the brake member 22 at all times to urge it upwardly towards the vehicle frame so that such brake member 22 seats against a support bracket 32 depending from the rear portion of the frame. Such bracket 32 may form a portion of the support means for a rear axle 34 of the vehicle and which has the rear wheels 18 suitably carried thereby.

The novel features of the invention particularly relate to a control means such as a control rod 40 that is secured, as by welding, to the front axle 20 and extends vertically upwardly therefrom. The control rod 40 extends through a tubular guide means 42. Such guide means, or sleeve 42 has a flanged lower end 44 and an upper washer or flange 46 operatively secured to it at its upper end and with the flanges 44 and washer or flange 46 slidably engaging with opposed top and bottom surfaces of the frame 12. Usually the slot 14 is outlined in the frame 12 as by top and bottom plates 48 that are suitably secured to the frame 12 by bolts 49 so that these plates provide wear resistant surfaces at the edges and top and bottom portions of the frame adjacent the slot 14. Usually the control rod 40 extends several inches up above the upper surface of the frame 12 and it has a steering member or bar 50 suitably secured thereto, as by the use of a T-shaped metal strap or bar 52. The bar 52 is retained on a threaded upper end of the control rod as by a retainer nut 53 and by a flattened section 40a at the upper end of the rod 40 engaging a complementary shaped hole in the bar 52. A plurality of cap screws or bolts 54 extend through spaced portions of the steering bar 50 and engage the metal bar 52 to retain the steering bar connected to the control rod. Such steering bar 50 normally extends transversely of the vehicle.

Usually the control rod 40 has a control sleeve 60 engaged therewith immediately below the frame 12. A spacer sleeve 62 is carried by the control rod immediately adjacent the front axle 20. Such control sleeve 60 includes a forwardly and upwardly extending finger or guide 64 that extends up into the slot 14 and is retained therein at all times to maintain the control sleeve in a centered position on the vehicle at all times. This control sleeve 60 has a flange 66 thereon and a suitable flexible connector cable 68 is operatively secured to the flange 66 and extends axially rearwardly of the vehicle to engage a member such as an eye screw 70 that is secured to the brake member 22. The cable 68 normally is under slight tension and it extends between the control rod 40 and the brake means when the sleeve and control rod 40 is at its rearmost position in the slot 14 as shown in FIG. 2. At this time, the brake member 22 is inoperative.

However, at any desired time, the person riding on the vehicle can affect a steering and/or braking action. Usually the person on the vehicle could be sitting on the back portion thereof and he may steer with his feet engaging opposite ends of the steering bar 50. Thus, one could push the control rod and associated means forwardly of the frame and this would bring the brake block or means 22 into engagement with the support surface or road to stop progress of the vehicle. At the same time, any arcuate steering action as required can be provided at any time since the steering and brake control unit of the invention will function for both steering and braking actions at all times. Yet, the positioning and control action of this control rod and associated means is well maintained mechanically to be readily controlled at all times. The vehicle is sturdy and will provide an effective steering and braking action under the control of the vehicle operator.

Obviously, suitable runner blades can readily be secured to the axles in place of the support wheels as shown.

The unit of the invention will provide fun and exercise and it is a sturdy toy type of a vehicle that will provide a long service life with a minimum of maintenance. Thus, it is believed that the objects of the invention have been achieved.

While one complete embodiment of the invention has been disclosed herein, it will be appreciated that modification of this particular embodiment of the invention may be resorted to without departing from the scope of the invention.

What is claimed is:

1. A land vehicle comprising:
 a flat support frame having a longitudinally extending slot therein,
 support means for said frame and including a front member, pivotally positioned brake means for the vehicle, and a steering and brake control assembly operatively engaging said front member, said steering and brake control assembly having a steering apparatus and a braking apparatus, said braking apparatus having a finger guide, and
 flexible connecting means operably extending between said pivotally positioned brake means and said braking apparatus to actuate said pivotally positioned brake means upon forward movement of said steering and brake control assembly;
 said steering apparatus rotatable within said braking apparatus, said finger guide of said braking apparatus slidable within said slot.

2. A land vehicle as in claim 1 where guide means slidably engage said slot and rotatably engage said steering apparatus, and said steering apparatus having a rod and bar means for steering action.

3. A toy type land vehicle comprising:
 an elongate flat support frame having a longitudinally extending slot in a front portion thereof,
 support means for said frame and including a front member, pivotally positioned brake means for the vehicle at the rear of said frame, and a steering and brake control assembly operatively engaging said front member and including a control rod secured to said front member and extending rotatably through said slot,
 guide means slidably engaging said slot and rotatably engaging said control rod,
 steering means fixedly secured to said control rod at an upper end thereof, said control rod being rotatable for steering action, and
 flexible connecting means operably extending between said pivotally positioned brake means and said steering and brake control assembly to actuate said pivotally positioned brake means upon forward movement of said steering and brake control assembly.

4. A land vehicle as in claim 3 where spring means bias said brake means to inoperative position.

5. A land vehicle as in claim 4 where said guide means normally are at the back end of said slot.

* * * * *